US006645424B2

United States Patent
Yi et al.

(10) Patent No.: US 6,645,424 B2
(45) Date of Patent: Nov. 11, 2003

(54) COMBUSTION SYNTHESIS OF GLASS ($AL_2O_3$-CAO-X-Y) CERAMIC ($TIB_2$) COMPOSITES

(75) Inventors: Hu Chun Yi, Newfoundland (CA); Jacques Y. Guigné, Newfoundland (CA); John J. Moore, Golden, CO (US)

(73) Assignee: Guigne International Ltd., Newfoundland (CA)

( * ) Notice: Subject to any disclaimer, the term of this patent is extended or adjusted under 35 U.S.C. 154(b) by 0 days.

(21) Appl. No.: 10/145,177

(22) Filed: May 13, 2002

(65) Prior Publication Data

US 2003/0061832 A1 Apr. 3, 2003

Related U.S. Application Data

(63) Continuation-in-part of application No. 09/591,902, filed on Jun. 12, 2000, now abandoned.

(51) Int. Cl.[7] .............................................. B29C 35/02
(52) U.S. Cl. .................... 264/649; 264/80; 264/234; 65/17.4; 65/17.5; 501/32
(58) Field of Search ...................... 264/80, 234, 649; 65/17.4, 17.5; 501/32

(56) References Cited

U.S. PATENT DOCUMENTS

| 3,948,669 | A | * | 4/1976 | Brydges et al. ............... 501/10 |
| 4,861,734 | A | * | 8/1989 | MacDowell .................. 501/10 |
| 5,112,777 | A | * | 5/1992 | MacDowell .................. 501/32 |
| 5,534,470 | A | * | 7/1996 | Andrus et al. ................ 501/32 |
| 5,792,417 | A | * | 8/1998 | Yi et al. ...................... 264/649 |
| 6,004,705 | A | * | 12/1999 | Masaki et al. ................ 430/15 |
| 6,159,322 | A | * | 12/2000 | Ogata et al. ................ 156/230 |

* cited by examiner

*Primary Examiner*—Tom Dunn
*Assistant Examiner*—Colleen P. Cooke
(74) *Attorney, Agent, or Firm*—Timothy Thut Tyson; Norton R. Townsley; Freilich, Hornbaker & Rosen (57) ABSTRACT

The present invention is directed to the preparation of in-situ formation of a series of glass-ceramic composites by the Self-propagating High temperature Synthesis (SHS) technique with advantages of processing simplicity as well as the potential of cost savings. The materials produced by the technique contain crystalline $TiB_2$ phase and have either a pure glassy matrix or a glass matrix with partial devitrification based on the $Al_2O_3$—CaO system. The materials can potentially be used for infrared light transmission and for other high temperature applications. These materials can also be produced with relatively high porosity.

21 Claims, 3 Drawing Sheets

COMBUSTION SYNTHESIS OF GLASS (AL₂O₃-CAO-X-Y) CERAMIC (TIB₂) COMPOSITES

CROSS REFERENCE

This application is a continuation-in-part of application Ser. No. 09/591,902, filed Jun. 12, 2000 now abandoned.

BACKGROUND OF THE INVENTION

The present invention relates to the field of glass/ceramic composites and more particularly to glasses based on $Al_2O_3$—$CaO$ which include $TiB_2$ phase.

It has long been found that alumininate glasses based on $Al_2O_3$ and $CaO$ transmit infra-red light. Although there are other glasses which do this, (e.g., tellurites, germanates, etc.), the aluminates have a better combination of properties (optical, mechanical and thermal) as well as lower cost which makes them the attractive candidates when transmission out to about 6 $\mu$ is required. Glasses based on $CaO$—$Al_2O_3$ may be good candidates for this type of application since they are infrared light transmittable, have high softening temperature (>1000° C.) and good mechanical and thermal properties, and have lower costs compared to other similar materials Unfortunately, the $CaO$—$Al_2O_3$ system is readily devitrified and requires high critical cooling rate in order to form stable glass.

To promote glass formation, silica ($SiO_2$) has been added with some success. For instance, a composition of 48.6$Al_2O_3$-44.8$CaO$-6.6 $SiO_2$ (wt. %) was found to be devitrification free [see, J. E. Stanworth,, *J. Soc. Glass Technol.*, 1948, vol. 32, pp. 154–172]. Glasses based on $Al_2O_3$-$CaO$ without silica but with a complex composition were also produced [see, K. H. Sun, *Glass Ind.*, 1949, vol. 30(4), pp.199–200, 232.]. Later on, silica free glasses with much simpler composition [e.g., 47$Al_2O_3$-43$CaO$-10$BaO$ (wt. %)] were reported to be formed by Florence et al. [see, J. M., Florence, et al., *J. Res. Natn. Bur. Stand.*, 1955, vol. 55, pp.231–237]. Finally, many glass compositions based on $Al_2O_3$-$CaO$ and containing $Na_2O$, $K_2O$, $MgO$, $BaO$, $La_2O_3$ and $Fe_2O_3$ were produced by Hafner et al. [H. C. Hafner et al., *J. Am Ceramic Soc.*, vol 41(8), 1958, pp.315–323]. However, these glasses were also devitrified to a different degree and pure glasses were obtained only after up to 5 mol % $SiO_2$ was added.

This invention uses a novel technique to produce glasses based on $Al_2O_3$-$CaO$ with the possibility of lower costs than the traditional processing technique. The new glasses created in this invention have a simpler composition than those produced by Hafner et al. mentioned above. The glass matrix is based on $Al_2O_3$-$CaO$-$BaO$-$SiO_2$ which contains higher $A_2O_3$ content and exhibits high softening temperature and better corrosion resistance. It also contains crystalline $TiB_2$ phase which appears as precipitates. The material can also be produced to contain relatively high porosity which finds use in applications requiring light weight and high temperature corrosion resistance.

The traditional technique of manufacturing $Al_2O_3$—$CaO$ glasses involves fusion of the oxides at 1400–1500° C. for a long time followed by casting and shaping to desired shapes. On the other hand, this invention uses the Self-propagating High Temperature Synthesis (SHS) or Combustion Synthesis technique which is a favorable technique to produce glassy materials since the technique offers instant high combustion temperature without a furnace.

The application of the SHS technique to produce various crystalline materials has been demonstrated in many published articles and in a number of review articles [e.g., Moore and Feng, *Progress in Materials Science*, Vol. 39, 243–316 (1995); Munir and Anselmi-Tamburini, *Materials Science Reports*, vol.3, 277–365 (1989), Yi and Moore, *J. Mater. Sci.*, vol. 25, 1159–1168 (1990)]. Simply speaking, the technique uses reactant powders to form a green pellet which is then ignited by an external heat source to generate chemical reactions, producing the end product in-situ. The SHS process can be realized by two modes, i.e., propagation (or combustion) mode and simultaneous (or thermal explosion) combustion mode. In the propagation mode, the reactants are ignited by an external heat source. Once ignited, the highly exothermic reaction ignites the next adjacent reactant layer by itself thereby generating a self-sustaining wave propagating toward the un-reacted part. In the simultaneous combustion mode, all the reactants are heated uniformly until the combustion reaction is initiated simultaneously throughout the whole pellet. A combustion synthesis reaction is defined by mainly three parameters: ignition temperature, which is the temperature at which the reaction rate becomes appreciable and self-sustaining; combustion temperature, which is the maximum temperature achieved; and combustion wave velocity, which is the overall combustion rate. However, the state of green reactants, (i.e. particle size, green density, reaction environment etc.) has a profound influence on the combustion synthesis process.

The present authors synthesized series of glass ceramic composites based on $Al_2O_3$—$B_2O_3$—$BaO$ and $Al_2O_3$—$B_2O_3$—$MgO$ glasses using the SHS technique (see Yi et al, U.S. Pat. No. 5,792,417 and Yi et al., U.S. Pat. application Ser. No. 09/351,227). The present invention is a further continuation in this work which reveals processing of another series of glass-ceramic composites based on $CaO$—$Al_2O_3$—X—Y. In these series X and Y can be any metal or any metal oxide. For purposes of this application, metal is defined to include Si. However in this document only examples of X and Y being $SiO_2$ and $BaO$ are given.

Development of glass ($Al_2O_3$—$CaO$—X—Y) ceramic ($TiB_2$) composites and methods of synthesizing them represents a great improvement in the field of glasses and ceramics and satisfies a long felt need of the ceramic engineer.

SUMMARY OF THE INVENTION

This invention is a method for synthesising glass-ceramic composites, comprising the following steps:

1. mixing the reactant powders in proportion according to one of the following reactions:

$$3TiO_2+3B_2O_3+10Al+\alpha CaO \rightarrow 3TiB_2+5Al_2O_3+\alpha CaO+Q \quad (1)$$

$$3TiO_2+3B_2O_3+10Al+\alpha CaO+\beta X \rightarrow 3TiB_2+5Al_2O_3+\alpha CaO+\beta X+Q \quad (2)$$

$$3TiO_2+3B_2O_3 10Al+\alpha CaO+\beta X+\gamma Y \rightarrow 3TiB_2 5Al_2O_3+\alpha CaO+\beta X+\gamma Y+Q \quad (3)$$

$$TiH_2+B_2O_3+2Al+\alpha CaO+\beta X+\gamma Y \rightarrow TiB_2+Al_2O_3+\alpha CaO+\beta X+\gamma Y+H_2(g)+Q \quad (4)$$

$$Ti+B_2O_3+2Al+\alpha CaO+\beta X+\gamma Y \rightarrow TiB_2+Al_2O_3 \alpha CaO+\beta X+\gamma Y+Q \quad (5)$$

where X and Y represent any metal oxide or any metal. For the purposes of this application metal is defined to include Si. It is desirable to limit the amount of silica to be added since it reduces the infrared transmission and heavier oxide such as BaO is preferred.

2. pressing the mixed powders into pellets; and
3. igniting the pellets in an argon atmosphere by resistant heating of a W-wire.

The glasses or partially devitrified glasses produced are based on the $A_2O_3$—CaO system and may contain one or more other substances resulting in $A_2O_3$—CaO—X—Y. The preferred composition of the products is $Al_2O_3$—CaO—BaO—$SiO_2$. The products also contain a ceramic phase, the ceramic phase being $TiB_2$. The preferred product has the following composition:

$TiB_2$: 13–26 wt. %
$Al_2O_3$: 29–50 wt. %
CaO: 16–42 wt. %
$SiO_2$: 0–35 wt. %
BaO: 0–17 wt. %.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

The present invention uses powder reactants as raw materials. The powders are weighed according to the desired composition and thoroughly mixed by ball milling. Pellets with green densities (typically around 60% of theoretical) are pressed uniaxially. The final products were synthesized by igniting green pellets, thus establishing a self-propagating combustion reaction until the whole pellet is reacted. The combustion reactions were ignited by the propagation combustion mode. Pellets were ignited at one end in an inert atmosphere inside a chamber, and the combustion proceeded in a self-propagating way. The combustion temperatures (Tc) were measured by inserting C-type (5% W-Rh vs 26% W-Rh) thermocouples and wave velocities were measured by frame-by-frame analysis of a video recording of the combustion reaction. Microstructures were analysed by X-ray diffraction (XRD) and microscope.

Pellets could also be ignited by the simultaneous combustion mode, where a pellet was placed inside a furnace and heated to a certain temperature until combustion reactions are generated throughout of the whole sample. Combustion synthesis operations could also be carried out in air using other ignition techniques shown in our previous work (Yi et al., U.S. patent in application Ser. No. 09/351,227).

Binary CaO—$Al_2O_3$ with different compositions were first synthesized according to the following reaction:

(1)

The self-propagating combustion reaction is sustained by aluminum reducing $TiO_2$ and $B_2O_3$ at the combustion front thus releasing a large amount of heat (Q=612.4 kilo calorie) which is high enough to fuse the $Al_2O_3$ and CaO together forming a matrix comprising the two phases. The crystalline $TiB_2$ phase also exists in the product as a by-product (throughout document, the term matrix refers to the phases excluding the $TiB_2$ phase). By adjusting the coefficient a, binary CaO—$Al_2O_3$ system with different matrix compositions can be created. In the current work, compositions with different mass ratios of the two oxides were produced, with those containing higher aluminum oxide having higher combustion temperatures and wave velocities as expected. Unfortunately, none of these binary compositions formed pure glass matrices as will be shown later.

As mentioned before, glass formation may be promoted by adding another glass former such as $SiO_2$, or by adding another substance like BaO, or by adding both or more. To achieve this, the following reactions were conducted:

(3)

X and Y can be any metal or metal oxide. For purposes of this application, metal is defined to include Si. In reaction (2), X (e.g., $SiO_2$, or BaO) is added to promote and stabilize the glass melt, while in reaction (3), both X (e.g., $SiO_2$) and Y (e.g., BaO) are added. The relative amounts of oxides in the glass matrix are adjusted by the coefficients α, β, and γ. Like CaO, the substances represented by X and Y act as diluents which reduce the combustion temperature and wave velocity. Therefore, there are maximum amounts of diluents that can be added without affecting self-propagating combustion reactions.

It was found that the combustion characteristics are greatly affected by the amount of diluent and by the amount of aluminium in the starting materials. Both the combustion temperature and wave velocity decreased with the increase of the amounts of diluents, and the opposite is true as the amount of aluminium oxide is increased. The latter was apparently caused by the increased exothermicity.

Microstructural analysis showed that none of the materials produced by reaction (1) formed substantial glass phase. However, those produced by reaction (2), i.e., $Al_2O_3$—CaO—$SiO_2$ system do form glass. As the amount of the $SiO_2$ increased, the glass phase also increased. It was also found that samples containing higher aluminum oxide favor glass formation, possibly due to higher combustion temperature associated with these combustion reactions. The combination of $SiO_2$ and BaO, as prepared by conducting reaction (3), also promoted glass formation. Materials with pure glass matrices have been formed in this system. All materials also contain the $TiB_2$ phase.

Typical apparent porosity (open pores) of the reacted samples was around <30% and overall porosity around 60% when samples were prepared using titanium dioxide as one of the reactants. In an effort to make these materials more porous, titanium hydride ($TiH_2$) was substituted for the titanium dioxide ($TiO_2$). For example, to produce porous $Al_2O_3$—CaO—$SiO_2$—BaO glass, the following reaction was carried out:

(4)

The evolution of the hydrogen gas at the combustion front promoted formation of pores. The final reacted products contained apparent porosity of >40% and overall porosity of 60%. Exactly the same products can also be formed by substituting titanium dioxide in Reactions (1)–(3) by tita nium. For instance, the glass matrix of $Al_2O_3$—CaO—$SiO_2$—BaO can also be produced by the following reaction:

$$Ti+B_2O_3+2Al+\alpha CaO+\beta X+\gamma Y \rightarrow TiB_2+Al_2O_3 \alpha CaO+\beta X \gamma Y+Q \quad (5)$$

Materials

Characteristics of the reaction powders are listed in Table 1.

TABLE I

Specifications of the Reactant Powders

| Reactant | Particle Size, µm | Impurity, % |
|---|---|---|
| Al | <44 | <0.5 |
| $B_2O_3$ | <44 | <0.02 |
| CaO | <44 | <0.01 |
| $SiO_2$ | <44 | <0.5 |
| $TiH_2$ | <44 | <1 |
| BaO | <149 | <0.5 |
| Ti | <44 | <1 |

Examples of various matrix compositions in reacted products and the fractions of reactants to form them are given in Tables 2 and 3. The compositions are represented by weight (mass) percentage throughout this document unless specified otherwise. The matrix composition here is defined as the composition of the reacted product excluding $TiB_2$. For example, a composition represented by $50Al_2O_3$-$30CaO$-$10SiO_2$-$10BaO$ means the composition excluding TiB2 is 50wt. % $Al_2O_3$-30wt. % CaO-10wt. % $SiO_2$-10 wt. % BaO. The overall composition (including $TiB_2$ phase) of these materials is shown in Table 4.

Materials shown in Table 2 used $TiO_2$ as one of the reactants. However, in certain situations, porous glass materials may be desired. Therefore, titanium hydride ($TiH_2$) was used to replace titanium oxide to generate the same materials shown in the Table 2. Examples of selected materials with the same matrix composition are shown in Table 3. These materials produced using titanium hydride instead of titanium oxide contain higher porosity due to the evolution of hydrogen gas at the combustion front as shown in reaction (4).

TABLE 2

Matrix Compositions (wt. %) of selected samples produced by the Combustion Reactions (1)–(3) and the weight percentage of Reactants to produce them

| Matrix Composition in Product (wt. %) | alpha | beta | gamma | $TiO_2$ | $B_2O_3$ | Al | CaO | $SiO_2$ | BaO | Reaction |
|---|---|---|---|---|---|---|---|---|---|---|
| $50Al_2O_3$-50CaO | 9.1 | 0.0 | 0.0 | 19.5 | 17.0 | 22.0 | 41.5 | 0.0 | 0.0 | 1 |
| $45Al_2O_3$-45CaO-10$SiO_2$ | 9.1 | 1.9 | 0.0 | 17.9 | 15.6 | 20.1 | 38.0 | 8.4 | 0.0 | 2 |
| $40Al_2O_3$-40CaO-20$SiO_2$ | 9.1 | 4.2 | 0.0 | 16.2 | 14.1 | 18.2 | 34.4 | 17.2 | 0.0 | 2 |
| $40Al_2O_3$-40CaO-10$SiO_2$-10BaO | 9.1 | 2.1 | 0.8 | 16.2 | 14.1 | 18.2 | 34.4 | 8.6 | 8.6 | 3 |
| $47Al_2O_3$-43CaO-10BaO | 8.3 | 0.0 | 0.7 | 18.5 | 16.2 | 20.8 | 36.1 | 0.0 | 8.4 | 2 |
| $45Al_2O_3$-35CaO-20$SiO_2$ | 7.1 | 3.8 | 0.0 | 17.9 | 15.6 | 20.1 | 29.6 | 16.9 | 0.0 | 2 |
| $39.4Al_2O_3$-30.6CaO-30$SiO_2$ | 7.1 | 6.5 | 0.0 | 15.9 | 13.9 | 17.9 | 26.4 | 25.8 | 0.0 | 2 |
| $45Al_2O_3$-35CaO-10$SiO_2$-10BaO | 7.1 | 1.9 | 0.7 | 17.9 | 15.6 | 20.1 | 29.6 | 8.4 | 8.4 | 3 |
| $62.5Al_2O_3$-37.5CaO | 5.5 | 0 | 0 | 23.4 | 20.4 | 26.3 | 29.9 | 0.0 | 0.0 | 1 |
| $56.25Al_2O_3$-33.75CaO-10$SiO_2$ | 5.5 | 1.5 | 0.0 | 21.5 | 18.7 | 24.2 | 27.4 | 8.1 | 0.0 | 3 |
| $50Al_2O_3$-30CaO-20$SiO_2$ | 5.5 | 3.4 | 0.0 | 19.5 | 17.0 | 22.0 | 24.9 | 16.6 | 0.0 | 2 |
| $43.8Al_2O_3$-26.2CaO-30$SiO_2$ | 5.5 | 5.8 | 0.0 | 17.4 | 15.2 | 19.6 | 22.3 | 25.4 | 0.0 | 2 |
| $37.5Al_2O_3$-22.5CaO-40$SiO_2$ | 5.5 | 9.0 | 0.0 | 15.3 | 13.3 | 17.2 | 19.5 | 34.7 | 0.0 | 2 |
| $50Al_2O_3$-30CaO-20BaO | 5.5 | 0.0 | 1.3 | 19.5 | 17.0 | 22.0 | 24.9 | 0.0 | 16.6 | 2 |
| $50Al_2O_3$-30CaO-5$SiO_2$-15BaO | 5.5 | 0.8 | 1.0 | 19.5 | 17.0 | 22.0 | 24.9 | 4.2 | 12.5 | 3 |
| $50Al_2O_3$-30CaO-10$SiO_2$-10BaO | 5.5 | 1.7 | 0.7 | 19.5 | 17.0 | 22.0 | 24.9 | 8.3 | 8.3 | 3 |
| $50Al_2O_3$-30CaO-15$SiO_2$-5BaO | 5.5 | 2.5 | 0.3 | 19.5 | 17.0 | 22.0 | 24.9 | 12.5 | 4.2 | 3 |
| $50Al_2O_3$-30CaO-17.5$SiO_2$-2.5BaO | 5.5 | 3.0 | 0.2 | 19.5 | 17.0 | 22.0 | 24.9 | 14.5 | 2.1 | 3 |
| $45Al_2O_3$-27CaO-20$SiO_2$-8BaO | 5.5 | 3.8 | 0.6 | 17.9 | 15.6 | 20.1 | 22.8 | 16.9 | 6.8 | 3 |
| $41.7Al_2O_3$-25CaO-20$SiO_2$-13.3BaO | 5.4 | 4.1 | 1.1 | 16.7 | 14.6 | 18.9 | 21.4 | 17.1 | 11.4 | 3 |

TABLE 3

Matrix Compositions (wt. %) of selected samples produced by the Combustion Reactions (4) and the weight percentage of reactants to produce them

| Matrix Composition in Product (wt. %) | alpha | beta | gamma | $TiH_2$/Ti | $B_2O_3$ | Al | CaO | $SiO_2$ | BaO | Reaction |
|---|---|---|---|---|---|---|---|---|---|---|
| $50Al_2O_3$-30CaO-10$SiO_2$-10BaO | 1.1 | 0.3 | 0.1 | 18.1 | 25.3 | 19.6 | 22.2 | 7.4 | 7.4 | 4 |
| $50Al_2O_3$-30CaO-15$SiO_2$-5BaO | 1.1 | 0.5 | 0.1 | 18.1 | 25.3 | 19.6 | 22.2 | 11.1 | 3.7 | 4 |
| $50Al_2O_3$-30CaO-17.5$SiO_2$-2.5BaO | 1.1 | 0.6 | 0.0 | 18.1 | 25.3 | 19.6 | 22.2 | 13.0 | 1.9 | 4 |
| $33.3Al_2O_3$-20CaO-30$SiO_2$-16.7BaO | 1.1 | 1.5 | 0.3 | 13.2 | 18.4 | 14.3 | 16.2 | 24.3 | 13.5 | 4 |
| $37.5Al_2O_3$-22.5CaO-40$SiO_2$ | 1.1 | 1.8 | 0.1 | 14.5 | 20.3 | 15.7 | 17.8 | 31.7 | 0.0 | 4 |
| $50Al_2O_3$-30CaO-10$SiO_2$-10BaO | 1.1 | 0.3 | 0.1 | 17.5 | 25.5 | 19.7 | 22.4 | 7.5 | 7.5 | 5 |
| $50Al_2O_3$-30CaO-15$SiO_2$-5BaO | 1.1 | 0.5 | 0.1 | 17.5 | 25.5 | 19.7 | 22.4 | 11.2 | 3.7 | 5 |
| $50Al_2O_3$-30CaO-17.5$SiO_2$-2.5BaO | 1.1 | 0.6 | 0.0 | 17.5 | 25.5 | 19.7 | 22.4 | 13.1 | 1.9 | 5 |

TABLE 4

Overall Compositions (wt. %) of selected samples produced by the Reactions (1)–(4)

| Matrix Composition in Product (wt. %) | TiB$_2$ | Al$_2$O$_3$ | CaO | SiO$_2$ | BaO | Reaction |
|---|---|---|---|---|---|---|
| 50Al$_2$O$_3$-50CaO | 17.0 | 41.5 | 41.5 | 0.0 | 0.0 | 1 |
| 45Al$_2$O$_3$-45CaO-10SiO$_2$ | 15.5 | 38.0 | 38.0 | 8.4 | 0.0 | 2 |
| 40Al$_2$O$_3$-40CaO-20SiO$_2$ | 14.1 | 34.4 | 34.4 | 17.2 | 0.0 | 2 |
| 40Al$_2$O$_3$-40CaO-10SiO$_2$-10BaO | 14.1 | 34.4 | 34.4 | 8.6 | 8.6 | 3 |
| 47Al$_2$O$_3$-43CaO-10BaO | 16.1 | 39.4 | 36.1 | 0.0 | 8.4 | 2 |
| 45Al$_2$O$_3$-35CaO-20SiO$_2$ | 15.5 | 38.0 | 29.6 | 16.9 | 0.0 | 2 |
| 39.4Al$_2$O$_3$-30.6CaO-30SiO$_2$ | 13.9 | 33.9 | 26.4 | 25.8 | 0.0 | 2 |
| 45Al$_2$O$_3$-35CaO-10SiO$_2$-10BaO | 15.5 | 38.0 | 29.6 | 8.4 | 8.4 | 3 |
| 62.5Al$_2$O$_3$-37.5CaO | 20.4 | 49.8 | 29.9 | 0.0 | 0.0 | 1 |
| 56.25Al$_2$O$_3$-33.75CaO-10SiO$_2$ | 18.7 | 45.7 | 27.4 | 8.1 | 0.0 | 2 |
| 50Al$_2$O$_3$-30CaO-20SiO$_2$ | 17.0 | 41.5 | 24.9 | 16.6 | 0.0 | 2 |
| 43.8Al$_2$O$_3$-26.2CaO-30SiO$_2$ | 15.2 | 37.1 | 22.3 | 25.4 | 0.0 | 2 |
| 37.5Al$_2$O$_3$-22.5CaO-40SiO$_2$ | 13.3 | 32.5 | 19.5 | 34.7 | 0.0 | 2 |
| 50Al$_2$O$_3$-30CaO-20BaO | 17.0 | 41.5 | 24.9 | 0.0 | 16.6 | 2 |
| 50Al$_2$O$_3$-30CaO-5SiO$_2$-15BaO | 17.0 | 41.5 | 24.9 | 4.2 | 12.5 | 3 |
| 50Al$_2$O$_3$-30CaO-10SiO$_2$-10BaO | 17.0 | 41.5 | 24.9 | 8.3 | 8.3 | 3 |
| 50Al$_2$O$_3$-30CaO-15SiO$_2$-5BaO | 17.0 | 41.5 | 24.9 | 12.5 | 4.2 | 3 |
| 50Al$_2$O$_3$-30CaO-17.5SiO$_2$-2.5BaO | 17.0 | 41.5 | 24.9 | 14.5 | 2.1 | 3 |
| 45Al$_2$O$_3$-27CaO-20SiO$_2$-8BaO | 15.5 | 38.0 | 22.8 | 16.9 | 6.8 | 3 |
| 41.7Al$_2$O$_3$-25CaO-20SiO$_2$-13.3BaO | 14.6 | 35.6 | 21.4 | 17.1 | 11.4 | 3 |
| 50Al$_2$O$_3$-30CaO-10SiO$_2$-10BaO | 25.4 | 37.3 | 22.4 | 7.5 | 7.5 | 4 |
| 50Al$_2$O$_3$-30CaO-15SiO$_2$-5BaO | 25.4 | 37.3 | 22.4 | 11.2 | 3.7 | 4 |
| 50Al$_2$O$_3$-30CaO-17.5SiO$_2$-2.5BaO | 25.4 | 37.3 | 22.4 | 13.1 | 1.9 | 4 |
| 50Al$_2$O$_3$-30CaO-10SiO$_2$-10BaO | 25.4 | 37.3 | 22.4 | 7.5 | 7.5 | 5 |
| 50Al$_2$O$_3$-30CaO-15SiO$_2$-5BaO | 25.4 | 37.3 | 22.4 | 11.1 | 3.7 | 5 |
| 50Al$_2$O$_3$-30CaO-17.5SiO$_2$-2.5BaO | 25.4 | 37.3 | 22.4 | 13.1 | 1.9 | 5 |

Experimental Procedures

Preparation started by weighing the reactant powders according to the desired compositions and thoroughly mixing them using ball milling dry in an inert atmosphere for at least 12 hours. Green pellets were then prepared by pressing the mixed powders uniaxially into density of approximately 60% of their theoretical densities. Green pellets were ignited by resistant heating a W-coil in an inert atmosphere inside a reaction chamber.

Ignition of the combustion reactions were realized by using an Xantrex power supply (model no XFR40-70, available from Xantrex Technology, Inc. of Burnaby, BC, Canada). The ignition power was controlled by computer and kept constant at 20V, 69A, 3 seconds for all of the samples. Temperature profiles during the combustion reactions were recorded by a data acquisition system using the DAQPad-1200 from National Instruments Corporation of Austin, Tex. Two C-type thermocouples (W-5% Re/W-26% Re) of 0.005 inches in diameter (welded under flowing argon atmosphere) were used. The thermocouple signals were conditioned and amplified by 5B series modules which were also from National Instruments. Finally, a video recording system consisting of a color camera with micro-zoom lens and a VCR was used to record the whole combustion process, from which the wave velocity was determined by frame-by-frame analysis of the wave front.

Combustion Characteristics

Figure 1:
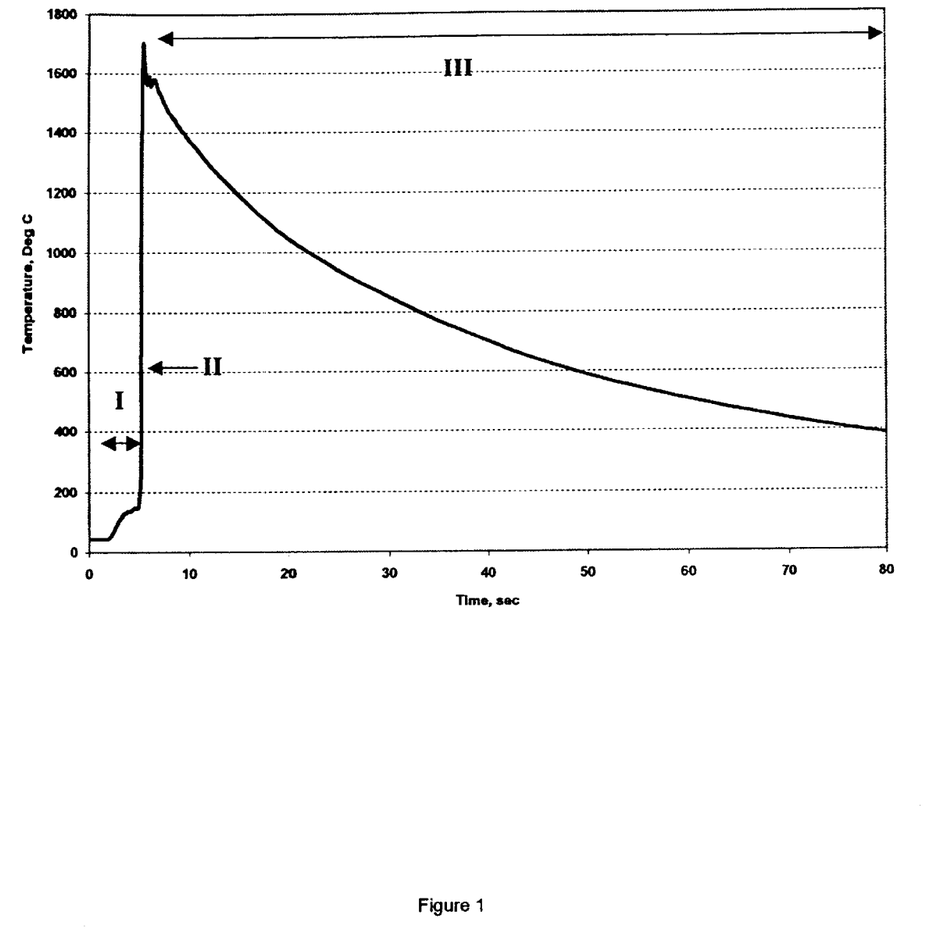
FIG. 1 is a graph of a typical temperature profile obtained during combustion synthesis of a sample having the composition $50Al_2O_3$-$30CaO$-$10SiO$-$10BaO$.

The ignition of these pellets was fairly easy and a self-propagating combustion wave was established in all samples. A typical temperature profile for a matrix composition of 50A$_2$O$_3$-30CaO-10SiO$_2$-10BaO (wt. %) that formed pure glass matrix (using reaction (3)) is shown in FIG. 1. The curve can be divided into three portions. The first portion (I) represents the temperature of the un-reacted part (room temperature), and the second portion (II) represents the sudden temperature rise to the maximum (combustion Temperature, Tc) when the combustion wave passed through the location of the thermocouples. A glass melt is formed at the combustion front. The third portion (III) represents the cooling process of the glass melt.

Figure 2:
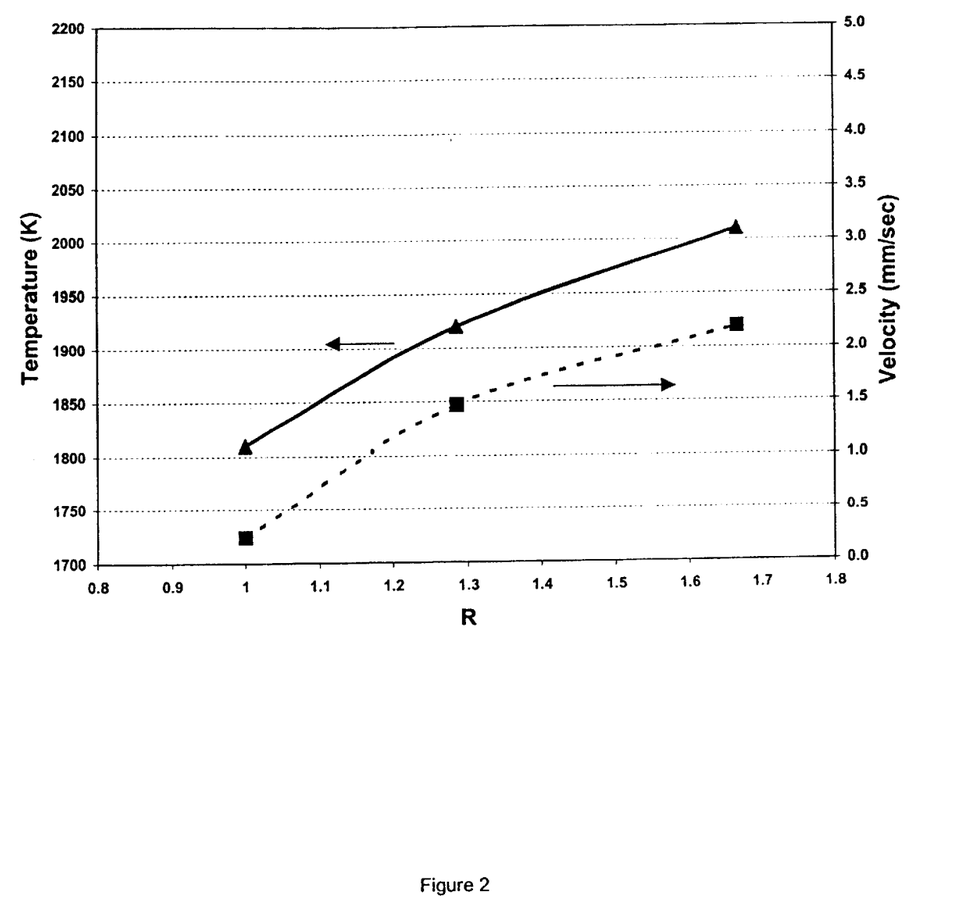
FIG. 2 is a graph illustrating the effect of $Al_2O_3$ content on combustion characteristics.

The relative amount of aluminum oxide, R (defined as the ratio of mass percentage of Al$_2$O$_3$ to that of CaO) in the matrix affects combustion characteristics substantially. This is illustrated in FIG. 2, where both the combustion temperature and wave velocity are plotted versus R for samples containing 20 wt. % SiO$_2$. The combustion temperatures increased from 1724 to 1919K, while the wave velocity increased from 1.1 to 3.1 mm/sec, as the R increased from 1.0 to 1.67 due to more heat being released. Undoubtedly, glass formation is also influenced substantially by combustion characteristics, particularly by the combustion temperature.

Figure 3:
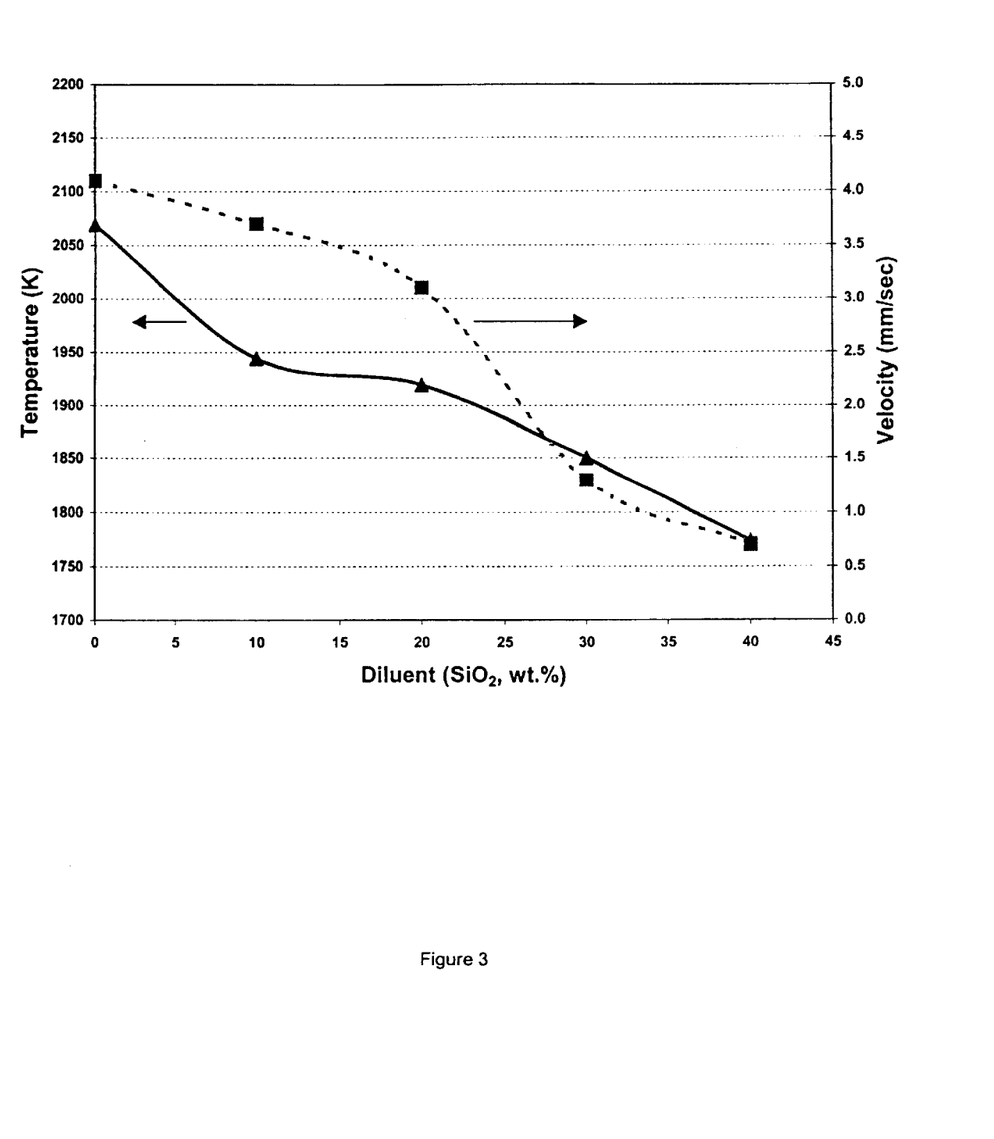
FIG. 3 is a graph illustrating the effect of diluent content on combustion characteristics.

The combustion characteristics are also affected by the amount of diluents, as plotted in FIG. 3 for samples reacted for reaction (2). In this plot, the R value is kept constant at 1.67. The combustion temperature decreased from 2069K to 1773K while the wave velocity decreased from 4.1 mm/sec to 0.7 mm/sec, as the amount of silica increased from 0 to 40 wt. %.

As mentioned earlier, titanium hydride (TiH$_2$) can be used to substitute for titanium oxide (TiO$_2$) to produce exactly the same compositions using reaction (4). It was found that for the same composition produced using reaction (4), both the combustion temperatures and wave velocities were lower than these produced using reaction (3). Titanium (Ti) can also be used to substitute titanium oxide (TiO$_2$) to produce the same using reaction (5).

Combustion characteristics of selected compositions for all of the five reactions are summarized in Tables 5 and 6.

TABLE 5

Combustion Temperature and Wave Velocity (average) for samples (represented by matrix composition) produced by Reactions (1)–(3)

| Matrix Composition (wt. %) | Tc, K | V, mm/s | R | Reaction |
|---|---|---|---|---|
| 50 Al$_2$O$_3$-50 CaO | 2108 | 4.1 | 1 | 1 |
| 45 Al$_2$O$_3$-45 CaO-10 SiO$_2$ | 1706 | 1.7 | 1 | 2 |
| 40 Al$_2$O$_3$-40 CaO-20 SiO$_2$ | 1724 | 0.96 | 1 | 2 |
| 40 Al$_2$O$_3$-40 CaO-10 SiO$_2$-10 BaO | 1782 | 0.78 | 1 | 3 |
| 47 Al$_2$O$_3$-43 CaO-10 BaO | 2013 | 2.2 | 1.09 | 2 |
| 45 Al$_2$O$_3$-35 CaO-20 SiO$_2$ | 1847 | 2.2 | 1.29 | 2 |
| 39.4 Al$_2$O$_3$-30.6 CaO-30 SiO$_2$ | 1809 | 0.9 | 1.29 | 2 |
| 45 Al$_2$O$_3$-35 CaO-10 SiO$_2$-10 BaO | 1978 | 3.7 | 1.29 | 3 |
| 62.5 Al$_2$O$_3$-37.5 CaO | 2069 | 4.1 | 1.67 | 1 |
| 56.25 Al$_2$O$_3$-33.75 CaO-10 SiO$_2$ | 1870 | 3.7 | 1.67 | 2 |
| 50 Al$_2$O$_3$-30 CaO-20 SiO$_2$ | 1944 | 3.1 | 1.67 | 2 |
| 43.8 Al$_2$O$_3$-26.2 CaO-30 SiO$_2$ | 1850 | 1.3 | 1.67 | 2 |
| 37.5 Al$_2$O$_3$-22.5 CaO-40 SiO$_2$ | 1773 | 0.7 | 1.67 | 2 |
| 50 Al$_2$O$_3$-30 CaO-20 BaO | 2040 | 0.36 | 1.67 | 2 |
| 50 Al$_2$O$_3$-30 CaO-5 SiO$_2$-15 BaO | 1958 | 0.32 | 1.67 | 3 |
| 50 Al$_2$O$_3$-30 CaO-10 SiO$_2$-10 BaO | 1912 | 2.8 | 1.67 | 3 |
| 50 Al$_2$O$_3$-30 CaO-15 SiO$_2$-5 BaO | 1950 | 1.6 | 1.67 | 3 |
| 50 Al$_2$O$_3$-30 CaO-17.5 SiO$_2$-2.5 BaO | 1806 | 1.9 | 1.67 | 3 |
| 45 Al$_2$O$_3$-27 CaO-20 SiO$_2$-8 BaO | 1916 | 2.1 | 1.67 | 3 |
| 41 Al$_2$O$_3$-25 CaO-20 SiO$_2$-13 BaO | 1875 | 1.7 | 1.67 | 3 |

TABLE 6

Combustion Temperature and Wave Velocity (average) for sample (represented by matrix composition) produced by Reactions (1)–(3)

| Matrix Composition in Product (wt. %) | Tc, K | V, mm/s | R | Reaction |
|---|---|---|---|---|
| 50 Al$_2$O$_3$-30 CaO-10 SiO$_2$-10 BaO | 1959 | 1.8 | 1.67 | 4 |
| 50 Al$_2$O$_3$-30 CaO-15 SiO$_2$-5 BaO | 1871 | 1.2 | 1.67 | 4 |
| 50 Al$_2$O$_3$-30 CaO-17.5 SiO$_2$-2.5 BaO | 1602 2324 | 1.5 | 1.67 | 4 |
| 50 Al$_2$O$_3$-30 CaO-10 SiO$_2$-10 BaO |  | 5.2 | 1.67 | 5 |
| 50 Al$_2$O$_3$-30 CaO-15 SiO$_2$-5 BaO | 2229 | 4.8 | 1.67 | 5 |
| 50 Al$_2$O$_3$-30 CaO-17.5 SiO$_2$-2.5 BaO | 2258 | 5.2 | 1.67 | 5 |

Glass Formation

The XRD and microscopic analysis results carried out are summarized in Table 7. The conventions used to describe the matrices in Table 7 are: pure glass indicating neither observable crystalline peaks on XRD patterns nor under microscope; mainly glass indicating small crystalline peaks on XRD patterns and/or small size sporadic crystalline phases observed under microscope; devitrified indicating appreciable amount of crystalline phases on the XRD and observable crystals in the glass matrix under microscope; and totally devitrified indicating mainly crystalline peaks on XRD and under microscope. All samples contain TiB2 phase which appears as crystalline precipitates.

Although the binary Al$_2$O$_3$—CaO system (near R=1) is a glass former [see H. Rawson, "inorganic glass-forming systems", Academic Press, London and New York (1967)], the present work on two compositions, i.e., 50Al$_2$O$_3$-5CaO, 62.5Al$_2$O$_3$-37.5CaO showed that they do not form glasses at all. Full devitrification occurred throughout these samples most likely due to the fact that these compositions require a very high critical cooling rate to form glass.

In order to promote glass formation, different amounts of SiO$_2$ were first added to the Al$_2$O$_3$—CaO system while keeping the R value at 1. Up to 20% of SiO$_2$ was added, but no pure glass matrix was formed. Examination of an optical photomicrograph of a samples with a matrix composition of 45Al$_2$O$_3$-45CaO-10SiO$_2$ revealed that extensive devitrification had occurred in the glass matrix. However, as the amount of silica increases, less devitrification and more glass phase had been formed. This was clear from examination of a photomicrograph of a sample with a matrix composition of 40Al$_2$O$_3$-40CaO-20SiO$_2$. Therefore, it can be concluded that silica indeed promotes glass formation.

Next, the R value was increased to 1.29 and up to 30% SiO$_2$ was added. Both the combustion temperature and wave velocity were increased compared to the samples with an R value of 1 and the same amount of silica (see FIG. 2). More importantly, it was found that more glass phases were formed. For instance, the samples containing more than 20% SiO$_2$ formed a mainly glass matrix (matrix composition of 45Al$_2$O$_3$-35CaO-20SiO$_2$ and of 39.4Al$_2$O$_3$-30.6CaO-30SiO$_2$). Comparing an optical photomicrograph of the 45Al$_2$O$_3$-35CaO-20SiO$_2$ with optical photomicrographs of other compositions, one concludes that more aluminium oxide also promotes glass formation, possibly through raising of the combustion temperature.

Further raising the R value to 1.67 had similar results to that with the R value being 1.29. In this case, samples with 10% SiO$_2$ added (56.25Al$_2$O$_3$-33.75CaO-10SiO$_2$) formed pure glass matrices. However other crystalline phases other than the TiB$_2$ were also observed on XRD. Increasing the silica concentration to 20% (50Al$_2$O$_3$-30CaO-20SiO$_2$) resulted in a mainly glass matrix. However, as the amount of silica further increased to 30%(43.8Al$_2$O$_3$-26.2CaO-30SiO$_2$) and 40% (37.5Al$_2$O$_3$-22.5CaO-40SiO$_2$), even more devitrification occurred. A possible reason for this is that the combustion temperatures became too low.

In a work reported by Florence et al., a silica free sample with the composition of 47Al$_2$O$_3$-43CaO-10BaO was found to have formed glass. This work seems to suggest that BaO also promotes glass formation. Unfortunately, the samples with the same matrix composition done in the current work failed to form pure glass (devitrification occurred). This is a composition that has a R value of 1.09 and the combustion temperature was 2013K.

Further attempts were also made to partially replace silica with BaO. Samples with a matrix composition of 40Al$_2$O$_3$-40CaO-10SiO$_2$-10BaO (R=1) and of 45Al$_2$O$_3$-35CaO-10SiO$_2$-10BaO (R=1.29) still devitrified, but a pure glass matrix was obtained for samples with matrix composition of50Al$_2$O$_3$-30CaO-10SiO$_2$-10BaO, 50Al$_2$O$_3$-30CaO-15SiO$_2$-5BaO, 45Al$_2$O$_3$-27CaO-20SiO$_2$-8BaO, and 41Al$_2$O$_3$-25CaO-20SiO$_2$-13BaO (R=1.67). TiB$_2$ is the only crystalline phase in these samples. On the other hand, those samples with silica free composition (e.g., 47Al$_2$O$_3$-43CaO-10BaO, 50Al$_2$O$_3$-30CaO-20BaO) failed to produce pure glass matrices in the current work. Therefore, it appears that both BaO and SiO$_2$ are required to stabilize Al$_2$O$_3$—CaO glass melts.

The vitrification behavior of samples produced from reactions (4) and (5), i.e., using titanium hydride or titanium to replace titanium dioxide, were the same. For instance, the samples with a matrix composition of 50Al$_2$O$_3$-30CaO-10SiO$_2$-10BaO produced by both reaction also formed a pure glass matrix (see Table 7).

TABLE 7

Microstructures of Reacted Samples

| R | Matrix Compositions (wt. %) | Matrix | Reaction |
|---|---|---|---|
| 1 | 50 Al$_2$O$_3$-50 CaO | Totally Devitrified | 1 |
| 1 | 45 Al$_2$O$_3$-45 CaO-10 SiO$_2$ | Devitrified | 2 |
| 1 | 40 Al$_2$O$_3$-40 CaO-20 SiO$_2$ | Devitrified | 2 |

TABLE 7-continued

Microstructures of Reacted Samples

| R | Matrix Compositions (wt. %) | Matrix | Reaction |
|---|---|---|---|
| 1 | 40 $Al_2O_3$-40 CaO-10 $SiO_2$-10 BaO | Devitrified | 3 |
| 1.09 | 47 $Al_2O_3$-43 CaO-10 BaO | Devitrified | 2 |
| 1.29 | 45 $Al_2O_3$-35 CaO-20 $SiO_2$ | Mainly Glass | 2 |
| 1.29 | 39.4 $Al_2O_3$-30.6 CaO-30 $SiO_2$ | Mainly Glass | 2 |
| 1.29 | 45 $Al_2O_3$-35 CaO-10 $SiO_2$-10 BaO | Mainly Glass | 3 |
| 1.67 | 62.5 $Al_2O_3$-37.5 CaO | Totally Devitrified | 1 |
| 1.67 | 56.25 $Al_2O_3$-33.75 CaO-10 $SiO_2$ | Pure Glass[†] | 2 |
| 1.67 | 50 $Al_2O_3$-30 CaO-20 $SiO_2$ | Mainly Glass | 2 |
| 1.67 | 43.8 $Al_2O_3$-26.2 CaO-30 $SiO_2$ | Mainly Glass | 2 |
| 1.67 | 37.5 $Al_2O_3$-22.5 CaO-40 $SiO_2$ | Devitrified | 2 |
| 1.67 | 50 $Al_2O_3$-30 CaO-20 BaO | Devitrified | 2 |
| 1.67 | 50 $Al_2O_3$-30 CaO-5 $SiO_2$-15 BaO | Devitrified | 3 |
| 1.67 | 50 $Al_2O_3$-30 CaO-10 $SiO_2$-10 BaO | Pure Glass | 3 |
| 1.67 | 50 $Al_2O_3$-30 CaO-15 $SiO_2$-5 BaO | Pure Glass | 3 |
| 1.67 | 50 $Al_2O_3$-30 CaO-17.5 $SiO_2$-2.5 BaO | Mainly Glass | 3 |
| 1.67 | 45 $Al_2O_3$-27 CaO-20 $SiO_2$-8 BaO | Pure Glass | 3 |
| 1.67 | 41.7 $Al_2O_3$-25 CaO-20 $SiO_2$-13.3 BaO | Pure Glass | 3 |
| 1.67 | 50 $Al_2O_3$-30 CaO-10 $Si_2$-10 BaO | Pure Glass | 4 |
| 1.67 | 50 $Al_2O_3$-30 CaO-15 $SiO_2$-5 BaO | Pure Glass | 4 |
| 1.67 | 50 $Al_2O_3$-30 CaO-17.5 $SiO_2$-2.5 BaO | Mainly Glass | 4 |
| 1.67 | 50 $Al_2O_3$-30 CaO-10 $SiO_2$-10 BaO | Pure Glass | 5 |
| 1.67 | 50 $Al_2O_3$-30 CaO-15 $SiO_2$-5 BaO | Pure Glass | 5 |
| 1.67 | 50 $Al_2O_3$-30 CaO-17.5 $SiO_2$-2.5 BaO | Pure Glass | 5 |

[†]Other crystalline phases, other than $TiB_2$, were also observed on XRD.

The morphology of the $TiB_2$ phase was also examined photomicrographically.

Porosity of the Products

Measurements on porosity of the reacted samples by the Archimedes method using water revealed that the overall porosity was around 60% (Table 8). Samples produced using reaction (4) had higher open and interconnected (apparent) pores than those produced by reaction (3). This is clearly caused by the evolution of the hydrogen gas generated in reaction (4).

TABLE 8

Porosity of Samples

| Samples | | Apparent (%) | Porosity (%) |
|---|---|---|---|
| 50 $Al_2O_3$-30 CaO-10 $SiO_2$-10 BaO | Reaction (3) | 19 | 60 |
| 50 $Al_2O_3$-30 CaO-10 $SiO_2$-10 BaO | Reaction (4) | 39 | 60 |
| 50 $Al_2O_3$-30 CaO-15 $SiO_2$-5 BaO | Reaction (3) | 11 | 62 |
| 50 $Al_2O_3$-30 CaO-15 $SiO_2$-5 BaO | Reaction (4) | 42 | 60 |

EXAMPLE 1

Reactant powders were dry mixed in proportions corresponding to a matrix composition of $50A_2O_3$-50CaO for at least 12 hours using ball milling. Cylindrical pellets of 2.5 grams each were then pressed uniaxially to a green density of 60% of theoretical. The pellets were then ignited in a combustion chamber by resistant heating a W-coil under inert Argon atmosphere. The average combustion temperature (Tc) was 2108 K and the average wave velocity was 4.1 mm/sec. X-ray diffraction (XRD) on powders crushed from the reacted pellets and microscopic observation on polished samples showed that the matrix was composed of totally crystalline phases, in addition to the $TiB_2$ phase.

EXAMPLE 2

Reactant powders were dry mixed in proportions corresponding to a matrix composition of $45A_2O_3$-45CaO-10$SiO_2$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1842 K and the average wave velocity was 1.7 mm/sec. X-ray diffraction (XRD) on powders crushed from the reacted pellets and microscopic observation on polished samples showed that the matrix was composed of a mixture of glass and crystalline phases, in addition to the $TiB_2$ phase.

EXAMPLE 3

Reactant powders were dry mixed in proportions corresponding to a matrix composition of $40A_2O_3$-40CaO-20$SiO_2$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1724 K and the average wave velocity was 1.1 mm/sec. X-ray diffraction (XRD) on powders crushed from the reacted pellets and microscopic observation on polished samples showed that the matrix was composed of a mixture of glass and crystalline phases, in addition to the $TiB_2$ phase.

EXAMPLE 4

Reactant powders were dry mixed in proportions corresponding to a matrix composition of $40A_2O_3$-40CaO-10$SiO_2$-10BaO for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1739 K and the average wave velocity was 1.5 mm/sec. X-ray diffraction (XRD) on powders crushed from the reacted pellets and microscopic observation on polished samples showed that the matrix was composed of a mixture of glass and crystalline phases, in addition to the $TiB_2$ phase.

EXAMPLE 5

Reactant powders were dry mixed in proportions corresponding to a matrix composition of $47A_2O_3$-43CaO-10BaO for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 2013 K and the average wave velocity was 2.2 mm/sec. X-ray diffraction (XRD) on powders crushed from the reacted pellets and microscopic observation on polished samples showed that the matrix was composed of devitrified glass phases, in addition to the $TiB_2$ phase.

EXAMPLE 6

Reactant powders were dry mixed in proportions corresponding to a matrix composition of $45A_2O_3$-35CaO-20$SiO_2$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1847 K and the average wave velocity was 2.2 mm/sec. X-ray diffraction (XRD) on powders crushed from the reacted pellets and microscopic observation on polished samples showed that the matrix was composed of mainly glass phase, in addition to the $TiB_2$ phase.

EXAMPLE 7

Reactant powders were dry mixed in proportions corresponding to a matrix composition of $39.4A_2O_3$-30.6CaO-$30SiO_2$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1809 K and the average wave velocity was 0.9 mm/sec. X-ray diffraction (XRD) on powders crushed from the reacted pellets and microscopic observation on polished samples showed that the matrix was composed of mainly glass phase, in addition to the $TiB_2$ phase.

EXAMPLE 8

Reactant powders were dry mixed in proportions corresponding to a matrix composition of $45A_2O_3$-35CaO-$10SiO_2$-10BaO for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1978 K and the average wave velocity was 3.7 mm/sec. X-ray diffraction (XRD) on powders crushed from the reacted pellets and microscopic observation on polished samples showed that the matrix was composed of mainly glass phase, in addition to the $TiB_2$ phase.

EXAMPLE 9

Reactant powders were dry mixed in proportions corresponding to a matrix composition of $62.5A_2O_3$-37.5CaO for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 2069 K and the average wave velocity was 4.1 mm/sec. X-ray diffraction (XRD) on powders crushed from the reacted pellets and microscopic observation on polished samples showed that the matrix was composed of totally crystalline phases, in addition to the $TiB_2$ phase.

EXAMPLE 10

Reactant powders were dry mixed in proportions corresponding to a matrix composition of $56.25A_2O_3$-33.75CaO-$10SiO_2$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1919 K and the average wave velocity was 3.7 mm/sec. X-ray diffraction (XRD) on powders crushed from the reacted pellets and microscopic observation on polished samples showed that the matrix was composed of pure glass, in addition to the $TiB_2$ phase, and other unknown crystalline phases.

EXAMPLE 11

Reactant powders were dry mixed in proportions corresponding to a matrix composition of $50A_2O_3$-30CaO-$20SiO_2$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1944 K and the average wave velocity was 3.1 mm/sec. X-ray diffraction (XRD) on powders crushed from the reacted pellets and microscopic observation on polished samples showed that the matrix was composed of mainly glass phase, in addition to the $TiB_2$ phase.

EXAMPLE 12

Reactant powders were dry mixed in proportions corresponding to a matrix composition of $43.8A_2O_3$-26.2CaO-$30SiO_2$ for at least 12 hours using ball milling. Cylindrical pellets of 2.5 grams each were then pressed uniaxially to a green density of 60% of theoretical. The pellets were then ignited in a combustion chamber by resistant heating a W-coil under inert Argon atmosphere. The average combustion temperature (Tc) was 1850 K and the average wave velocity was 1.3 mm/sec. X-ray diffraction (XRD) on powders crushed from the reacted pellets and microscopic observation on polished samples showed that the matrix was composed of mainly glass phase, in addition to the $TiB_2$ phase.

EXAMPLE 13

Reactant powders were dry mixed in proportions corresponding to a matrix composition of $37.5A_2O_3$-22.5CaO-$20SiO_2$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1773 K and the average wave velocity was 0.7 mm/sec. X-ray diffraction (XRD) on powders crushed from the reacted pellets and microscopic observation on polished samples showed that the matrix was composed of a mixture of glass and crystalline phases, in addition to the $TiB_2$ phase.

EXAMPLE 14

Reactant powders were dry mixed in proportions corresponding to a matrix composition of $50A_2O_3$-30CaO-20BaO for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 2040K and the average wave velocity was 3.6 mm/sec. X-ray diffraction (XRD) on powders crushed from the reacted pellets and microscopic observation on polished samples showed that the matrix was composed of devitrified glass phases, in addition to the $TiB_2$ phase.

EXAMPLE 15

Reactant powders were dry mixed in proportions corresponding to a matrix composition of $50A_2O_3$-30CaO-$5SiO_2$-15BaO for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1958 K and the average wave velocity was 3.2 mm/sec. X-ray diffraction (XRD) on powders crushed from the reacted pellets and microscopic observation on polished samples showed that the matrix was composed of a mixture of glass and devitrified glass phases, in addition to the $TiB_2$ phase.

EXAMPLE 16

Reactant powders were dry mixed in proportions corresponding to a matrix composition of $50A_2O_3$-$30CaO$-$10SiO_2$-$10BaO$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1912 K and the average wave velocity was 2.8 mm/sec. X-ray diffraction (XRD) on powders crushed from the reacted pellets and microscopic observation on polished samples showed that the matrix was composed of pure glass phase, in addition to the $TiB_2$ phase.

EXAMPLE 17

Reactant powders were dry mixed in proportions corresponding to a matrix composition of $50A_2O_3$-$30CaO$-$15SiO_2$-$5BaO$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1950 K and the average wave velocity was 1.6 mm/sec. X-ray diffraction (XRD) on powders crushed from the reacted pellets and microscopic observation on polished samples showed that the matrix was composed of pure glass phase, in addition to the $TiB_2$ phase.

EXAMPLE 18

Reactant powders were dry mixed in proportions corresponding to a matrix composition of $50A_2O_3$-$30CaO$-$17.5SiO_2$-$2.5BaO$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1806 K and the average wave velocity was 1.9 mm/sec. X-ray diffraction (XRD) on powders crushed from the reacted pellets and microscopic observation on polished samples showed that the matrix was composed of mainly glass phase with only very slight devitrification, in addition to the $TiB_2$ phase.

EXAMPLE 19

Reactant powders were dry mixed in proportions corresponding to a matrix composition of $45A_2O_3$-$27CaO$-$20SiO_2$-$8BaO$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1916 K and the average wave velocity was 2.1 mm/sec. X-ray diffraction (XRD) on powders crushed from the reacted pellets and microscopic observation on polished samples showed that the matrix was composed of pure glass phase, in addition to the $TiB_2$ phase.

EXAMPLE 20

Reactant powders were dry mixed in proportions corresponding to a matrix composition of $41.7A_2O_3$-$25CaO$-$20SiO_2$-$13.3BaO$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1916 K and the average wave velocity was 2.1 mm/sec. X-ray diffraction (XRD) on powders crushed from the reacted pellets and microscopic observation on polished samples showed that the matrix was composed of pure glass phase, in addition to the $TiB_2$ phase. Examples 1–20 used titanium dioxide (rutile) as one of the reactants (reactions 1–3). The following examples used titanium hydride as one of the reactants (reaction 4).

EXAMPLE 21

Reactant powders were dry mixed in proportions corresponding to a matrix composition of $50A_2O_3$-$30CaO$-$10SiO_2$-$10BaO$ for at least 12 hours using ball milling. Cylindrical pellets of 2.5 grams each were then pressed uniaxially to a green density of 60% of theoretical. The pellets were then ignited in a combustion chamber by resistant heating a W-coil under inert Argon atmosphere. The average combustion temperature (Tc) was 1959 K and the average wave velocity was 1.8 mm/sec. X-ray diffraction (XRD) on powders crushed from the reacted pellets and microscopic observation on polished samples showed that the matrix was composed of pure glass phase, in addition to the $TiB_2$ phase. The average apparent porosity was 39% as compared to 19% for the same composition samples produced in Example 15.

EXAMPLE 22

Reactant powders were dry mixed in proportions corresponding to a matrix composition of $50A_2O_3$-$30CaO$-$15SiO_2$-$5BaO$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperature (Tc) was 1871 K and the average wave velocity was 1.2 mm/sec. X-ray diffraction (XRD) on powders crushed from the reacted pellets and microscopic observation on polished samples showed that the matrix was composed of pure glass phase, in addition to the $TiB_2$ phase. The average apparent porosity was 42% as compared to 11% for the same composition samples produced in Example 16.

The following examples used titanium as one of the reactants (Reaction 5).

EXAMPLE 23

Reactant powders were dry mixed in proportions corresponding to a matrix composition of $50A_2O_3$-$30CaO$-$10SiO_2$-$10BaO$ for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperatures (Tc) were 2324 K and wave velocities were 5.2 mm/sec. The X-ray diffraction (XRD) on powders crushed from the reacted pellets and microscopic observation on polished samples showed that the matrix was composed of pure glass phase, in addition to the $TiB_2$ phase.

EXAMPLE 24

Reactant powders were dry mixed in proportions corresponding to a matrix composition of $50A_2O_3$-30CaO-$15SiO_2$-5BaO for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperatures (Tc) were 2229 K and wave velocities were 4.8 mm/sec. The X-ray diffraction (XRD) on powders crushed from the reacted pellets and microscopic observation on polished samples showed that the matrix was composed of pure glass phase, in addition to the $TiB_2$ phase.

EXAMPLE 25

Reactant powders were dry mixed in proportions corresponding to a matrix composition of $50A_2O_3$-30CaO-$17.5SiO_2$-2.5BaO for at least 12 hours using ball milling. Cylindrical pellets of 2.5 grams each were then pressed uniaxially to a green density of ~60% of theoretical. The pellets were then ignited in a combustion chamber by resistant heating a W-coil under inert Argon atmosphere. The average combustion temperatures (Tc) were 2258 K and wave velocities were 5.2 mm/sec. The X-ray diffraction (XRD) on powders crushed from the reacted pellets and microscopic observation on polished samples showed that the matrix was composed of pure glass phase, in addition to the $TiB_2$ phase.

Combustion synthesis of glass ($Al_2O_3$—CaO—X) ceramic ($TiB_2$) composites has been described with reference to particular embodiments. Other modifications and enhancements can be made without departing from the spirit and scope of the claims that follow.

What is claimed is:

1. A process of making a glass-ceramic composite comprising the steps of:
   a. providing powdered T, $B_2O_3$, Al, CaO, X and Y, where T, X and Y are different, T is selected from the group consisting of Ti, $TiO_2$ and $TiH_2$, X is selected from the group consisting of metal and metal oxide and Y is selected from the group consisting of metal and metal oxide;
   b. weighing the powders in the following mole ratio: $3TiO_2$, $3B_2O_3$, 10Al, $\alpha$CaO, $\beta$X and $\gamma$Y if T is $TiO_2$ and T, $B_2O_3$, 2Al, $\alpha$CaO, $\beta$X and $\gamma$Y if T is selected from the group consisting of Ti and $TiH_2$, where $\alpha$, $\beta$ and $\gamma$ represent non-zero numbers;
   c. mixing the powders dry for adequate time in a ball mill;
   d. forming the mixed powders into a green pellet, uniaxially, to a density of about 60% theoretical; and
   e. igniting the pellet, whereby a reaction product having the formula $3TiB_2$-$5Al_2O_3$-$\alpha$CaO-$\beta$X-$\gamma$Y is produced if T is $TiO_2$ and a reaction product having the formula $TiB_2$-$Al_2O_3$-$\alpha$CaO-$\beta$X-$\gamma$Y is produced if T is selected from the group consisting of Ti and $TiH_2$.

2. A process of making a glass-ceramic composite as claimed in claim 1 in which the BaO powder has a particle sizes less than 44 $\mu$m and contains impurities less than 0.5% and all other powders have a particle size of less than 44 $\mu$m and contain impurities less than 1%.

3. A process of making a glass-ceramic composite as claimed in claim 1 in which ignition is performed by resistance heating a W coil in an inert atmosphere inside a reaction chamber.

4. A process of making a glass-ceramic composite as claimed in claim 1 in which ignition is performed by resistance heating a Kanthal-wire in air.

5. A process of making a glass-ceramic composite as claimed in claim 1 in which ignition is performed by burning of a regular torch in air.

6. A process of making a glass-ceramic composite as claimed in claim 1 in which ignition is performed by placing the pellets into a furnace previously heated to over 600° C.

7. A process of making a glass-ceramic composite as claimed in claim 1 in which X is $SiO_2$ and Y is BaO.

8. A process of making a glass-ceramic composite comprising the steps of:
   a. providing powdered $TiO_2$, $B_2O_3$, Al and CaO;
   b. weighing the powders in the following mole ratio: $3TiO_2$, $3B_2O_3$, 10Al, $\alpha$CaO where $\alpha$ represents a non-zero number;
   c. mixing the powders dry for adequate time in a ball mill;
   d. forming the mixed powders into a green pellet, uniaxially, to a density of about 60% theoretical; and
   e. igniting the pellet, whereby a reaction product having the formula $3TiB2$-$5Al_2O_3$-$\alpha$CaO is produced.

9. A process of making a glass-ceramic composite as claimed in claim 8 in which the powders have particle sizes less than 44 $\mu$m and contain less than 1% impurities.

10. A process of making a glass-ceramic composite as claimed in claim 8 in which ignition is performed by resistance heating a W coil in an inert atmosphere inside a reaction chamber.

11. A process of making a glass-ceramic composite as claimed in claim 8 in which ignition is performed by resistance heating a Kanthal-wire in air.

12. A process of making a glass-ceramic composite as claimed in claim 8 in which ignition is performed by burning of a regular torch in air.

13. A process of making a glass-ceramic composite as claimed in claim 8 in which ignition is performed by placing the pellets into a furnace previously heated to over 600° C.

14. A process of making a glass-ceramic composite as claimed in claim 8 further comprising the steps of:
   a. providing powdered X, which is selected from the group consisting of any metal and any metal oxide except $TiO_2$; and
   b. adding $\beta$X to the other powders prior to mixing; whereby said reaction product additionally contains $\beta$X.

15. A process of making a glass-ceramic composite comprising the steps of:
   a. providing powdered $TiO_2$, $B_2O_3$, Al, CaO and X, where X is selected from the group consisting of any metal and any metal oxide except $TiO_2$;
   b. weighing the powders in the following mole ratio: $3TiO_2$, $3B_2O_3$, 10Al, $\alpha$CaO, $\beta$X, where $\alpha$ and $\beta$ represent non-zero numbers;
   c. mixing the powders dry for adequate time in a ball mill;
   d. forming the mixed powders into a green pellet, uniaxially, to a density of about 60% theoretical; and e. igniting the pellet, whereby a reaction product having the formula $3TiB_2\text{-}5Al_2O_3\text{-}\alpha CaO\text{-}\beta X$ is produced.

16. A process of making a glass-ceramic composite as claimed in claim 15 in which the powders have particle sizes less than 44 µm and contain less than 1% impurities.

17. A process of making a glass-ceramic composite as claimed in claim 15 in which ignition is performed by resistance heating a W coil in an inert atmosphere inside a reaction chamber.

18. A process of making a glass-ceramic composite as claimed in claim 15 in which ignition is performed by resistance heating a Kanthal-wire in air.

19. A process of making a glass-ceramic composite as claimed in claim 15 in which ignition is performed by burning of a regular torch in air.

20. A process of making a glass-ceramic composite as claimed in claim 15 in which ignition is performed by placing the pellets into a furnace previously heated to over 600° C.

21. A process of making a glass-ceramic composite as claimed in claim 15 in which X is selected from the group consisting of $SiO_2$ and BaO.

* * * * *